(12) United States Patent
Geuß

(10) Patent No.: US 11,097,661 B1
(45) Date of Patent: Aug. 24, 2021

(54) METHOD FOR OPERATING A DISPLAY ARRANGEMENT OF A MOTOR VEHICLE, AND MOTOR VEHICLE

(71) Applicant: AUDI AG, Ingolstadt (DE)

(72) Inventor: Matthias Geuß, Breitengüßbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/253,801

(22) PCT Filed: Jun. 3, 2019

(86) PCT No.: PCT/EP2019/064339
§ 371 (c)(1),
(2) Date: Dec. 18, 2020

(87) PCT Pub. No.: WO2020/030318
PCT Pub. Date: Feb. 13, 2020

(30) Foreign Application Priority Data

Aug. 6, 2018 (DE) .................... 10 2018 213 082.5

(51) Int. Cl.
*B60R 1/00* (2006.01)
*B60W 50/14* (2020.01)
(Continued)

(52) U.S. Cl.
CPC .................. *B60R 1/08* (2013.01); *B60R 1/12* (2013.01); *B60R 2001/1253* (2013.01);
(Continued)

(58) Field of Classification Search
CPC ....... B60R 1/08; B60R 1/12; B60R 2300/802; B60R 2001/1253; B60R 2300/806;
(Continued)

(56) References Cited

U.S. PATENT DOCUMENTS

| | | |
|---|---|---|
| 2013/0265431 A1 | 10/2013 | Hattori et al. |
| 2016/0210861 A1 | 7/2016 | Bergsagel et al. |

(Continued)

FOREIGN PATENT DOCUMENTS

| | | |
|---|---|---|
| DE | 10 2009 023 435 A1 | 1/2010 |
| DE | 20 2013 101 083 U1 | 7/2013 |

(Continued)

OTHER PUBLICATIONS

Examination Report dated Dec. 6, 2018 in corresponding German application No. 10 2018 213 082.5; 12 pages including Machine-generated English-language translation.
(Continued)

*Primary Examiner* — Howard D Brown, Jr.
*Assistant Examiner* — Tyler B Edwards
(74) *Attorney, Agent, or Firm* — Maier & Maier, PLLC

(57) ABSTRACT

A method for operating a display arrangement of a motor vehicle. A camera continuously captures camera images of a motor vehicle environment and a display device shows the camera images in the form of an alternating image display. An additional, continuously changing image element is shown in or adjacent to the display of alternating images. The image element does not change if a malfunction of the camera and/or the display device and/or another component of the display arrangement results in the display of a still image comprising a single camera image by the display device.

17 Claims, 2 Drawing Sheets

(51) Int. Cl.
   *B60R 11/04* (2006.01)
   *B60R 1/08* (2006.01)
   *B60R 1/12* (2006.01)
(52) U.S. Cl.
   CPC ..... *B60R 2300/305* (2013.01); *B60R 2300/70* (2013.01); *B60R 2300/802* (2013.01); *B60R 2300/806* (2013.01); *B60R 2300/8046* (2013.01)
(58) Field of Classification Search
   CPC ...... B60R 2300/8046; B60R 2300/305; B60R 2300/70
   See application file for complete search history.

(56) References Cited

U.S. PATENT DOCUMENTS

| | | | |
|---|---|---|---|
| 2017/0094268 A1 | 3/2017 | Gulati et al. | |
| 2018/0370435 A1 | 12/2018 | Konno | |

FOREIGN PATENT DOCUMENTS

| | | | | |
|---|---|---|---|---|
| DE | 202013101083 U1 * | 7/2013 | ............. | H04N 7/183 |
| DE | 10 2014 106 035 A1 | 11/2015 | | |
| DE | 10 2015 111 773 A1 | 2/2016 | | |
| JP | 2016102939 A | 6/2016 | | |
| JP | 2018056950 A | 4/2018 | | |
| WO | 2017/110324 A1 | 6/2017 | | |
| WO | WO-2017110324 A1 * | 6/2017 | ............. | B60R 11/04 |

OTHER PUBLICATIONS

International Search Report dated Jul. 11, 2019 in corresponding International application No. PCT/EP2019/064339; 7 pages.
Written Opinion of the International Searching Authority dated Jul. 11, 2019 in corresponding International application No. PCT/EP2019/064339; 10 pages including Machine-generated English-language translation.
International Preliminary Report on the Patentability dated Feb. 13, 2020 in corresponding International application No. PCT/EP2019/064339; 13 pages including Machine-generated English-language translation.
Notification of Transmittal of Translation of the International Preliminary Report on Patentability dated Feb. 11, 2021, in connection with corresponding International Application No. PCT/EP2019/064339; 6 pages.

* cited by examiner

METHOD FOR OPERATING A DISPLAY ARRANGEMENT OF A MOTOR VEHICLE, AND MOTOR VEHICLE

FIELD

The disclosure relates to a method for operating a display arrangement of a motor vehicle, a camera continuously capturing camera images of a motor vehicle environment, and a display device showing the camera images in the form of an alternating image display. The disclosure furthermore relates to a motor vehicle.

BACKGROUND

Classic exterior mirrors or rearview mirrors in motor vehicles are increasingly being replaced by virtual rearview mirrors. While in a classic exterior mirror a user or driver of the motor vehicle sees a mirror image of the surroundings of the motor vehicle in a permanent mirror, in a virtual rearview mirror an image of a particularly rearward surroundings of the motor vehicle is recorded by a recording device that is displayed to the user via a display device in the motor vehicle.

In contrast to classic rearview mirrors, in which the user can always rely on the fact that the image visible in the permanent mirror actually represents the current situation, with a virtual rearview mirror it is conceivable that the image displayed by the display device does not show the current situation, but a frozen image. This is particularly conceivable when there is a technical defect or a malfunction of a component of the virtual rearview mirror system.

A frozen image in a virtual rearview mirror represents a risk, in particular when the motor vehicle is stationary. Situations are conceivable in which the user opens the driver's door of the motor vehicle and wants to get out while at this moment another motor vehicle or a bicycle passes the motor vehicle which is not displayed in the virtual rearview mirror due to a frozen image. A frozen image of a virtual rearview mirror can also pose a particularly high risk if the motor vehicle is a truck or a bus that wants to make a right turn, and a cyclist is currently on a cycle path extending to the right of the motor vehicle. In order to minimize such hazards, some systems for detecting possible malfunctions of virtual rearview mirrors have already been disclosed in the prior art.

US 2017/094 268 A1, for example, discloses a test method relating to a display system, in particular a virtual rearview mirror. A test pattern is inserted into an image, with checksums being determined and evaluated as a function of the test pattern in order to detect a possible malfunction of the display system.

US 2016/210 861 A1 discloses a monitoring system relating in particular to an image recorded by a rearview camera The associated video signal is analyzed accordingly to determine whether there is a frozen still image. If this is the case, an optical or acoustic warning signal is output, for example.

The underlying object of the invention is to provide an improved way of outputting a malfunction of a virtual rearview mirror and therefore of informing a user accordingly.

SUMMARY

According to the invention, this object is achieved in that, in a method of the type mentioned at the outset, an additional, continuously changing image element is displayed in or adjacent to the alternating image display, and if there is a malfunction of the camera and/or the display device and/or another component of the display arrangement, which malfunction leads to the display of a still image comprising a single camera image by the display device, that image element does not change.

The display of the constantly changing image element or throbber enables a user or driver to recognize a malfunction and thus the presence of a frozen still image in a comparatively simple manner Thus, during the proper operation of the components of the display arrangement, if the display device consequently displays the alternating image representation, the constantly changing image element is additionally displayed. The constantly changing image element is also coupled to the changing image display in such a way that, if there is a malfunction that leads to a freezing of the changing image display, that is, to a still image, the constantly changing image element no longer changes. This enables a user to easily recognize the presence of a respective malfunction. In particular, if the user has already got used to the presence of a constantly changing image element, the user can intuitively recognize that there is an error when the throbber no longer changes.

In addition, the method according to the invention has the advantage that the display of an error based on a non-changing image element is reliable. In particular, warning signals to be output must first be generated by components of respective monitoring systems after an error has been detected. However, if these components are also affected by a possible malfunction, it is conceivable that the warning signal may not be available and the user is not informed of the malfunction. A image element that does not change according to the invention also arises regardless of components that are necessary for generating a warning signal. If, for example, the display device, which can be a display or a touchscreen, freezes, then the image element does not automatically change either. But an optical warning signal is not displayed by the display device in this case, since an optical warning signal naturally cannot be displayed by a frozen image representation. The representation according to the invention of a non-changing image element therefore represents a reliable way of informing the user about incorrect information from the virtual rearview mirror.

In a method according to the invention, at least one piece of error information relating to the presence of the malfunction of the camera and/or the display device and/or a further component of the display arrangement is detected, the image element being generated as a function of the error information.

It is therefore conceivable that the non-changing image element is generated when respective error information is present. If, on the other hand, there is no error information, then the changing image element can be generated. Respective error information can be present, for example, if one of the components of the display arrangement or of the virtual rearview mirror fails. For example, the camera can be checked to determine whether the images sent by the camera are identical, that is to say, whether there is a malfunction in the camera that leads to a frozen still image.

It is also conceivable that at least one piece of operating information relating to the operation of the motor vehicle is detected, the image element being displayed only when a display condition that depends on the operating information is met. In particular, situations are conceivable in which the throbber does not need to be displayed, since, for example, the camera image naturally changes constantly anyway and the user recognizes a malfunction solely through an unchanged image. In these cases, it makes sense that the image element is not generated.

In a further developed embodiment, the operating information relates to the state of motion of the motor vehicle, wherein the display condition is only met when the motor vehicle is moving. Thus, in the event that the motor vehicle is moving, it is not necessary to display the throbber, since in this case the camera image is constantly changing anyway. In this case, the user will immediately and intuitively associate a non-moving still image with a fault in the virtual rearview mirror. In this case, the display of the throbber, i.e. the generation of the image element, leads to redundant information for a user.

However, it is conceivable that the user can switch on the throbber anyway if, for example, he habitually prefers that the constantly changing image element is also displayed while driving. To this end, an operating device of the motor vehicle, such as a button, can be provided, for example. A respective setting by the user via an operating menu is also conceivable.

Likewise, the method according to the invention can allow a user to switch off the throbber accordingly.

In the method according to the invention, a bar that changes its geometry or a number that represents an incremental sequence of numbers or an object that is moving and/or changing its color and/or its line thickness and/or its position in the image displayed by the display device can be used as a constantly changing image element. The constantly changing image element can therefore be an animation which, for example, can be set as desired by the user. In this context, it is also conceivable that the size and/or the type of change in the image element can be set by the user. In the event that the constantly changing image element is a geometric shape that changes its geometry, it is conceivable that the image element is a periodically increasing and decreasing bar or a circle or the like that is pulsating and changes with respect to its radius, for example. Alternatively or additionally, it is conceivable that the color of the constantly changing image element changes, for example, every second. The color can change between two or more colors, for example. In addition, the color of the throbber can run through continuous color transitions, particularly the entire color spectrum. Different variants with regard to the change in the image element can be combined here.

It is conceivable that the image element occupies a particularly rectangular partial area of the camera image displayed by the display device, preferably in a corner of the camera image. If displaying the camera image does not use the entire display area of the display device, the throbber can also be displayed next to the camera image.

In addition to the camera image, the display device can also display at least one image segment that contains information relating to the driving operation of the motor vehicle. The image segment can in particular be a rectangular image that is displayed by the display device in addition to the camera image. The image segment and the camera image can be displayed next to one another or partially overlapping. However, the image segment can also be embedded in the camera image or partially overlap it, especially if it represents writing consisting of letters and/or numbers.

In a further developed embodiment, it is conceivable that the information relating to the driving operation of the motor vehicle relates to data from a navigation system and/or auxiliary lines of a parking assistance system and/or the current speed of the motor vehicle and/or the current time of day or the distance to a vehicle in front. Alternatively or additionally, it is conceivable that the information relating to the driving operation of the motor vehicle relates to a distance covered by the motor vehicle and/or a current fuel consumption and/or the like. It is also conceivable that the constantly changing image element is the image segment or is contained in the image segment. If the information relating to the driving operation of the motor vehicle is displayed in the form of letters or numbers, the color and/or the line width of the font used for this can change. In this case, as already mentioned, the constantly changing image element, which in this case is the image segment, can be embedded in the camera image.

In the event that the image segment contains information from a navigation system, it is conceivable that the image segment displays another camera image showing the front surroundings of the motor vehicle or a map of the surroundings, with a navigation arrow also being displayed in the image segment. In this case, the navigation arrow is preferably the continuously changing image element, which for example changes its color and/or pulsates.

The image segment can also consist of auxiliary lines of a parking assistance system that are superimposed on the camera images to support the user when parking. In this case, the auxiliary lines can be the constantly changing image element, wherein the color and/or the width of the lines is changing.

The parallel or simultaneous use of several constantly changing image elements or throbbers is conceivable.

In the method according to the invention, it is conceivable that a control device controls the image display mode, wherein this control device or another control device generates the image element. The control device can either be provided as a separate component which is connected to the camera and to the display device, or as a component of the camera or the display device. The control device can in particular be set up to detect the error information and/or the operating information and to control the image display mode as a function thereof. With regard to the error information, it is also particularly conceivable that this information also relates to the presence of a possible malfunction of the control device itself.

The invention also relates to a motor vehicle comprising a display device for displaying the camera images in the form of an alternating image display and a control device, wherein the control device is set up to control the operation of the display arrangement of the motor vehicle according to the method explained above.

The features described for the method according to the invention and the advantages mentioned can accordingly be transferred to the motor vehicle according to the invention.

BRIEF DESCRIPTION OF THE FIGURES

Further advantages and details of the invention will be apparent from the exemplary embodiments described below and with reference to the drawings. Wherein.

DETAILED DESCRIPTION

Figure 1:
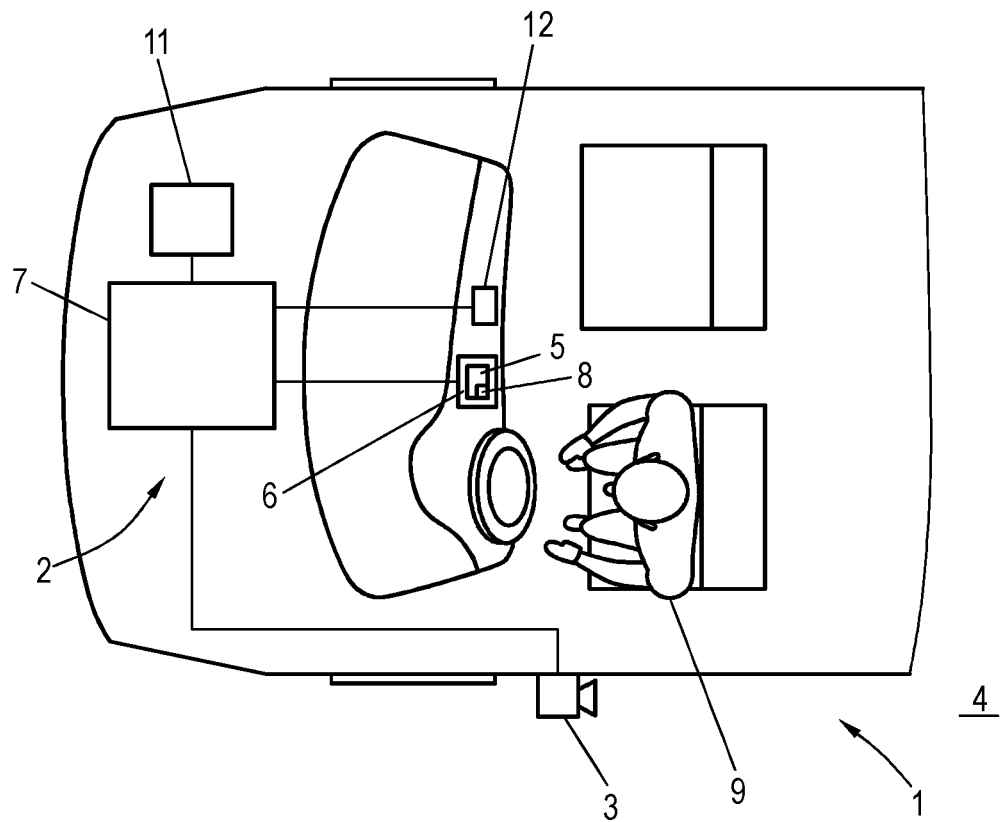
FIG. 1 schematically shows a top view of the front of an exemplary embodiment of a motor vehicle according to the invention, FIG. 2 schematically shows the image displayed by a display device of the embodiment of the vehicle according to the invention, and FIG. 3 schematically shows the image displayed by a display device of another exemplary embodiment of the motor vehicle according to the invention.

FIG. 1 schematically shows a motor vehicle 1 with a display arrangement 2. Here, a camera 3 is provided for the ongoing detection of a motor vehicle environment 4, in particular an environment behind the motor vehicle 1, wherein a display device 6 is provided for displaying the camera images 5 in the form of a changing image display. The display arrangement 2 can also be referred to as a virtual rearview mirror and comprises the camera 3, the display device 6, and a control device 7 of the motor vehicle 1.

In addition to the changing image display of the camera images 5 by the display device 6, a continuously changing image element 8 is displayed. If due to a malfunction of the camera 3 and/or the display device 6 and/or another component of the display arrangement, the camera images from the display device 6 are no longer in the form of an alternating image display, but only in the form of a still image comprising a single camera image 5, the image element does not change.

A user 9 or driver of the motor vehicle 1 is thus enabled, in the case of a frozen still image displayed by the display device 6, to intuitively and immediately recognize the presence of a malfunction relating to the display arrangement 2 and therefore to be aware that he cannot trust the current display of the virtual rearview mirror or the display arrangement 2. Particularly in the case when the user 9 has already gotten used to the constantly changing image element 8 or the throbber, he can immediately conclude that a non-moving throbber means that the display device 6 is displaying a still image.

The image display operation is controlled by the controller 7. For this, the camera 3 transmits the recordings of the motor vehicle environment 4 to the control device 7, wherein the control device 7 in turn transmits the camera images 5 to the display arrangement 2. Although the control device 7 is provided as a separate component in the exemplary embodiment shown, it is conceivable that the control device 7 is alternatively a component of the camera 3 or of the display device 6.

The control device 7 is therefore set up in the motor vehicle 1, for example, to detect error information relating to the presence of a malfunction in the camera 3 and/or the display device 6 and/or the control device 7 itself and/or another component of the display arrangement 2. The image element 8 is generated by the control device 7 as a function of the error information.

In addition, the control device 7 is set up, although this is not absolutely necessary, to record operational information relating to the operation of the motor vehicle 1, wherein the image element 8 is only displayed when a display condition dependent on the operational information is met. In particular, in the exemplary embodiment shown, the image element 8 is only displayed when the motor vehicle 1 is not driving. In this case, it is clear to the user 9 that the camera images 5 must be displayed by the display device 6 in the form of an alternating image display. If there is a still image while driving, the user 9 intuitively concludes that there must be a malfunction in the display arrangement 2. The display of the image element 8 is unnecessary in this case.

Figure 2:
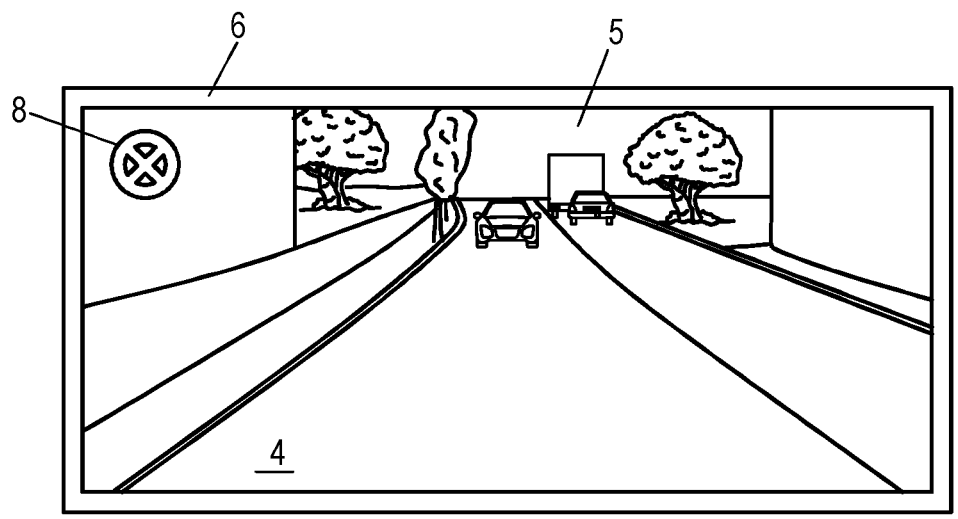

FIG. 2 shows the view of the display device 6 from the perspective of a user 9. The entire display area of the display device 6 is filled, for example, by the camera image 5, which represents the rearward motor vehicle environment 4. In the exemplary embodiment shown, the continuously changing image element 8 is, for example, a rotating wheel that overlays the camera image 5. Alternatively, it is conceivable that the constantly changing image element 8 is a bar that changes its geometry or a number that represents an incremental sequence of numbers, or an object that moves and/or changes its color and/or its line width and/or its position in the image displayed by the display device 6.

Figure 3:
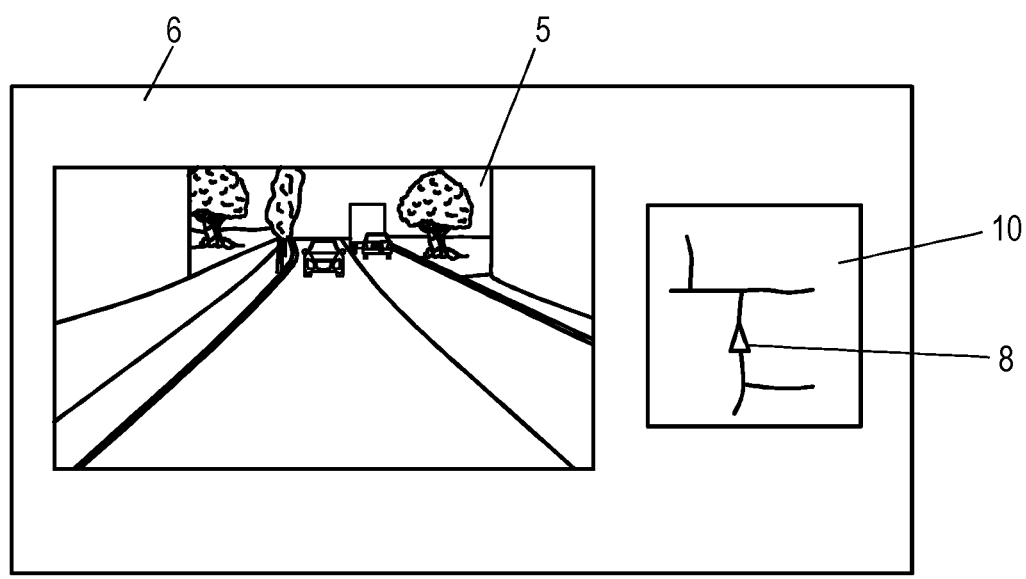

FIG. 3 also shows the view of the display device 6 of another exemplary embodiment of the motor vehicle 1 according to the invention from the perspective of a user 9. In addition to the camera image 5, the display device 6 shows an image segment 10 that contains information from a navigation system 11 of the motor vehicle 1. The data shown by the image segment 10 relating to the navigation system 11 are just exemplary, that is, the image segment 10 can alternatively also contain other information relating to the driving operation of the motor vehicle 1. In the other exemplary embodiment of the motor vehicle 1, the image segment 10 is arranged next to the camera image 5 by way of example, but can also be faded in or embedded in the camera image 5. In this case, the image segment 10 itself can be the constantly changing image element 8. In the exemplary embodiment shown in FIG. 3, the constantly changing image element 8 is a navigation arrow in the image segment 11. As an example, it is envisaged here that the navigation arrow constantly changes its color and pulsates. In addition, although not shown in FIG. 3, it is conceivable that a rotating wheel as shown in FIG. 2 is also displayed in the camera image 5.

The invention claimed is:

1. A method for operating a display arrangement of a motor vehicle, wherein a camera continuously captures camera images of a motor vehicle environment and a display device shows the camera images in the form of an alternating image display, wherein an additional, continuously changing image element is shown in or adjacent to the display of alternating images, wherein the image element does not change if a malfunction of the camera and/or the display device and/or another component of the display arrangement results in the display of a still image comprising a single camera image by the display device wherein at least one piece of operating information relating to the operation of the motor vehicle is detected, wherein the image element is only displayed if a display condition dependent on the operating information is met, wherein the operating information relates to the state of motion of the motor vehicle, wherein the display condition is only met when the motor vehicle is not moving.

2. The method according to claim 1, wherein at least one piece of error information relating to the presence of the malfunction of the camera and/or the display device and/or another component of the display arrangement is detected, wherein the image element is generated as a function of the error information.

3. The method according to claim 1, wherein a bar that changes its geometry or a number that represents an incrementing sequence of numbers, or an object which is moving and/or changing its color and/or its line width and/or its position in the image displayed by display device is displayed as the constantly changing image element.

4. The method according to claim 1, wherein the display device displays at least one image segment in addition to the camera image, which segment contains information relating to the driving operation of the motor vehicle.

5. The method according to claim 4, wherein the information relating to the driving operation of the motor vehicle relates to data from a navigation system and/or auxiliary lines of a parking assistance system and/or the current speed of the motor vehicle and/or the current time of day or the distance to a vehicle in front.

6. The method according to claim 4, wherein the constantly changing image element is the image segment or is contained in the image segment.

7. The method according to claim 1, wherein a control device controls the image display mode, wherein said or another control device generates the image element.

8. A motor vehicle, comprising a display arrangement with a camera for continuously capturing a camera image of a motor vehicle environment, a display device for displaying the camera images in the form of an alternating image display, and a control device, wherein the control device is set up to control the operation of the display arrangement of the motor vehicle according to the method according to claim 1.

9. The method according to claim 2, wherein a bar that changes its geometry or a number that represents an incrementing sequence of numbers, or an object which is moving and/or changing its color and/or its line width and/or its position in the image displayed by display device is displayed as the constantly changing image element.

10. The method according to claim 2, wherein the display device displays at least one image segment in addition to the camera image, which segment contains information relating to the driving operation of the motor vehicle.

11. The method according to claim 3, wherein the display device displays at least one image segment in addition to the camera image, which segment contains information relating to the driving operation of the motor vehicle.

12. The method according to claim 4, wherein the constantly changing image element is the image segment or is contained in the image segment.

13. The method according to claim 2, wherein a control device controls the image display mode, wherein said or another control device generates the image element.

14. The method according to claim 3, wherein a control device controls the image display mode, wherein said or another control device generates the image element.

15. The method according to claim 4, wherein a control device controls the image display mode, wherein said or another control device generates the image element.

16. The method according to claim 5, wherein a control device controls the image display mode, wherein said or another control device generates the image element.

17. The method according to claim 6, wherein a control device controls the image display mode, wherein said or another control device generates the image element.

\* \* \* \* \*